US006757891B1

(12) United States Patent
Azagury et al.

(10) Patent No.: US 6,757,891 B1
(45) Date of Patent: Jun. 29, 2004

(54) METHOD AND SYSTEM FOR REDUCING THE COMPUTING OVERHEAD ASSOCIATED WITH THREAD LOCAL OBJECTS (75) Inventors: Alain Azagury, Nesher (IL); Elliott Karl Kolodner, Haifa (IL); Michael Factor, Haifa (IL); Avi Teperman, Haifa (IL); Martin John Trotter, Ampfield (GB)

(73) Assignee: International Business Machines Corporation, Armonk, NY (US)

(*) Notice: Subject to any disclaimer, the term of this patent is extended or adjusted under 35 U.S.C. 154(b) by 538 days.

(21) Appl. No.: 09/614,870

(22) Filed: Jul. 12, 2000

(51) Int. Cl.[7] .................................................. G06F 9/45
(52) U.S. Cl. ...................... 717/158; 717/116; 717/118; 717/141; 717/148; 718/102; 719/332
(58) Field of Search ................................ 717/153–154, 717/158, 162–167, 118, 116, 141, 148; 709/100, 102, 106–108, 331–332

(56) References Cited

U.S. PATENT DOCUMENTS

| | | | | | |
|---|---|---|---|---|---|
| 5,652,883 | A | * | 7/1997 | Adcock | 707/206 |
| 6,028,999 | A | * | 2/2000 | Pazel | 717/134 |
| 6,108,754 | A | * | 8/2000 | Lindholm | 711/122 |
| 6,304,949 | B1 | * | 10/2001 | Houlsdworth | 711/170 |
| 6,370,684 | B1 | * | 4/2002 | De Pauw et al. | 717/124 |
| 6,381,738 | B1 | * | 4/2002 | Choi et al. | 717/124 |
| 6,438,560 | B1 | * | 8/2002 | Loen | 707/103 R |
| 6,487,714 | B1 | * | 11/2002 | Azagury et al. | 717/116 |
| 6,487,716 | B1 | * | 11/2002 | Choi et al. | 717/159 |
| 6,505,344 | B1 | * | 1/2003 | Blais et al. | 717/151 |
| 6,530,079 | B1 | * | 3/2003 | Choi et al. | 717/158 |
| 6,542,891 | B1 | * | 4/2003 | Loen et al. | 711/122 |

OTHER PUBLICATIONS

Burke et al., The Jalapeno Dynamic Optimizing Compiler for JavaTM, Jun. 1999, ACM Java Grande Conference, San Francisco California*

Jong–Deok Choi et al., "Escape Analysis for Java", in OOPSLA '99, IBM T.J. Watson Research Center, Yorktown Heights, NY, Nov. 1999.

David Bacon et al., "Thin Locks: Featherweight Synchronization for Java", in SIGPLAN '98, IBM T.J. Watson Research Center, 1998.

* cited by examiner

Primary Examiner—Antony Nguyen-Ba
(74) Attorney, Agent, or Firm—Browdy and Neimark, P.L.L.C.

(57) ABSTRACT

A computer-implemented method for reducing a computing overhead associated with objects that are local to a particular thread and can be accessed solely by that thread. Dynamically during run-time, an object is determined to be local to a particular thread and can be accessed solely by that thread, whereby a computing overhead associated with that object may be reduced. Likewise, cache locality may be optimized in respect of objects that are determined to be global so as to avoid putting them in the same cache line, whilst thread-local objects are preferably stored in a cache line associated with that thread.

48 Claims, 7 Drawing Sheets

METHOD AND SYSTEM FOR REDUCING THE COMPUTING OVERHEAD ASSOCIATED WITH THREAD LOCAL OBJECTS

RELATED APPLICATION

This invention is related to our U.S. application Ser. No. 09/317,421 entitled "Mechanism for dynamic selection of an object's method", filed on May 24, 1999 in the name of Factor et al. and assigned to the present assignee.

FIELD OF THE INVENTION

This invention relates to object-oriented programming and particularly to an object's method execution during run-time.

BACKGROUND OF THE INVENTION

An object-oriented program can keep track of whether or not an object is thread-local. This can be tracked dynamically using a write barrier, as described in detail in U.S. patent application Ser. No. 09/356,532 by Trotter and Kolodner on thread-local heaps.

A global object is an object that can be accessed by more than one thread. A thread-local object is an object that can be accessed by a single thread only. Similar definitions apply to global roots and local roots (e.g., references in the registers and the stack of a thread). The write barrier is used for stores of references into global roots and into objects, in the following manner:

(a) An indicator is associated with object to show whether it is global. If the indicator is set, the object is global; otherwise, it is local.

(b) Before a reference is assigned to a global variable:
  i) If the referenced object is local, then trace the sub-graph of objects rooted at the referenced object and mark every object in that sub-graph global.
  ii) Do the assignment.

(c) Before a reference is assigned to a field of an object whose global indicator is set:
  i) If the referenced object is local, then trace the sub-graph of objects rooted at the referenced object and mark every object in that sub-graph global.
  ii) Do the assignment.

Thread-locality is a property that can also be shown to hold statically, e.g., by a compile-time analysis. See, for example, Choi, Gupta, et. al., "Escape Analysis for Java" in OOPSLA 99, 11/99.

The present invention describes opportunities to exploit the thread-local property of an object in order to reduce the computing overhead on that object, and methods for exploiting those opportunities. The observation that thread-locality can be exploited to reduce computing overhead when it is tracked dynamically is new.

We also describe additional opportunities for exploiting thread-locality that have not been previously known (whether the locality property is obtained from a static analysis or tracked dynamically).

The thread-local property of the objects can be exploited in order to reduce the cost of other operations on these objects. In particular, synchronization costs on thread local objects can be avoided. In the implementation of Java, such savings can be significant.

General Information

When objects are used to implement re-useable components, e.g., a hash table, a sparse matrix, etc., good programming practice often leads to the implementations being thread-safe, i.e., supporting synchronization in the event that two or more threads attempt to use the object concurrently. The particular means of implementing the synchronization is language dependent. If the object is not actually used by more than one thread, the cost of synchronization is incurred with no actual run-time benefit.

An example of such re-useable components can be seen in Java, where many classes are thread-safe, i.e., they are implemented in such a way that their operation will be correct even if their instances are accessed simultaneously by multiple threads. These thread-safe classes are used in many cases where a non thread-safe equivalent would be safe to use. It is easier and safer to use the thread-safe classes than for the programmer to do the analysis that a non-thread safe version could be used. There are also cases where an object may not need to be thread-safe at one point in its lifetime, but may need to be thread-safe at a later point. Furthermore, the advantages of object-orientation and re-use can be better realized by using the thread-safe classes.

The mechanisms provided in Java to ensure thread-safe access are synchronized methods and synchronized statement. These synchronization mechanisms are implemented using monitors. Monitors are a language-level construct for providing mutually exclusive access to shared data structures in a multi-threaded environment. A low overhead locking scheme for Java is described by David F. Bacon et al. in "Thin Locks: Featherweight Synchronization for Java" appearing in the Proceedings of the ACM Conference on Programming Language and Design and Implementation, SIGPLAN Notices volume 33, number 6, Jun. 1998. As explained in this article, in Java the methods of an object may be declared synchronized meaning that the object must be locked for the duration of the method's execution. Such locking imposes an overhead, which is actually wasted in the event that the object is thread local and can be accessed only by a single thread.

Some experiments suggest that in fact on typical benchmarks and applications, more than 50% of all monitor operations can be seen to be carried out on thread local objects. It is believed that similar results may be seen in other languages.

These experiments indicate the need to provide a mechanism for exploiting the knowledge that an object is local to a particular thread and can be accessed solely by that thread in order to avoid unnecessary computation overhead.

SUMMARY OF THE INVENTION

It is therefore an object of the invention to provide a mechanism for exploiting the knowledge that an object is local to a particular thread and can be accessed solely by that thread in order to avoid unnecessary computation overhead.

According to a broad aspect of the invention there is provided a computer-implemented method for reducing a computing overhead associated with an object based on whether or not it is local to a particular thread and can be accessed solely by that thread, comprising the steps of:

(a) dynamically tracking the object during run-time so as to derive information as to whether or not the object is local to a particular thread and can be accessed solely by that thread, and (b) using said information to reduce a computing overhead associated with said object.

Such a method finds particular application in Java for objects that are determined to be thread-local, where there are very precise rules as to when modifications to an object must be written back to "main memory" such that they can be made visible to other threads. These rules require all updates to be written back to the heap whenever a lock is released. This precludes keeping updates only in thread local storage, such as registers, when a lock is released. However, if it is known that an object is thread local, then it is known that no other thread can access the object and the language's semantics will not be violated by keeping modified values in registers without writing them back to main memory. This can be done using the smart code mechanism described in U.S. patent Ser. No. 09/317,421 to Factor et al.

For example, if it is known that only one thread is accessing the object, it is possible to ignore the effects of weak consistency architectures (e.g., the fact that one processor may see the results of writes in an order different than the one in which they were executed). This too can be done using the smart code mechanism described in U.S. patent Ser. No. 09/317,421 to Factor et al.

The method according to the invention finds particular application for improving cache locality for thread-local objects by:

i) storing objects in cache lines each of which is associated with a respective thread, and ii) storing objects that are accessed by more than one thread in distinct cache lines.

The method according to the invention also finds particular application for detecting deadlock. For example, in a Java application deadlock can be detected by determining that a thread waits indefinitely for an object that is thread-local since it is impossible for another thread to notify the waiting thread.

The method according to the invention also finds particular application for avoiding synchronization costs on thread-local objects. For example, when used with a language/system that uses monitors, the method includes:

i) maintaining a count of a number of entries by said monitor, ii) obtaining a monitor lock on a thread local object without synchronization, iii) upon entering the monitor, incrementing the count without synchronization, and iv) upon exiting the monitor, decrementing the count without synchronization.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

The invention assumes that there exists a low cost mechanism for determining whether an object is thread local. For example in U.S. patent application Ser. No. 09/356,532 to Trotter and Kolodner, there is a global flag associated with each object. The object is thread local if the global flag is not set.

Avoiding Synchronization by Checking if the Object is Thread Local

To avoid an expensive operation on a thread local object, a check is made before entering the operation to determine if the object is thread local. If so, the low-cost alternative is executed. If not, the more expensive operation is executed.

Figure 1:
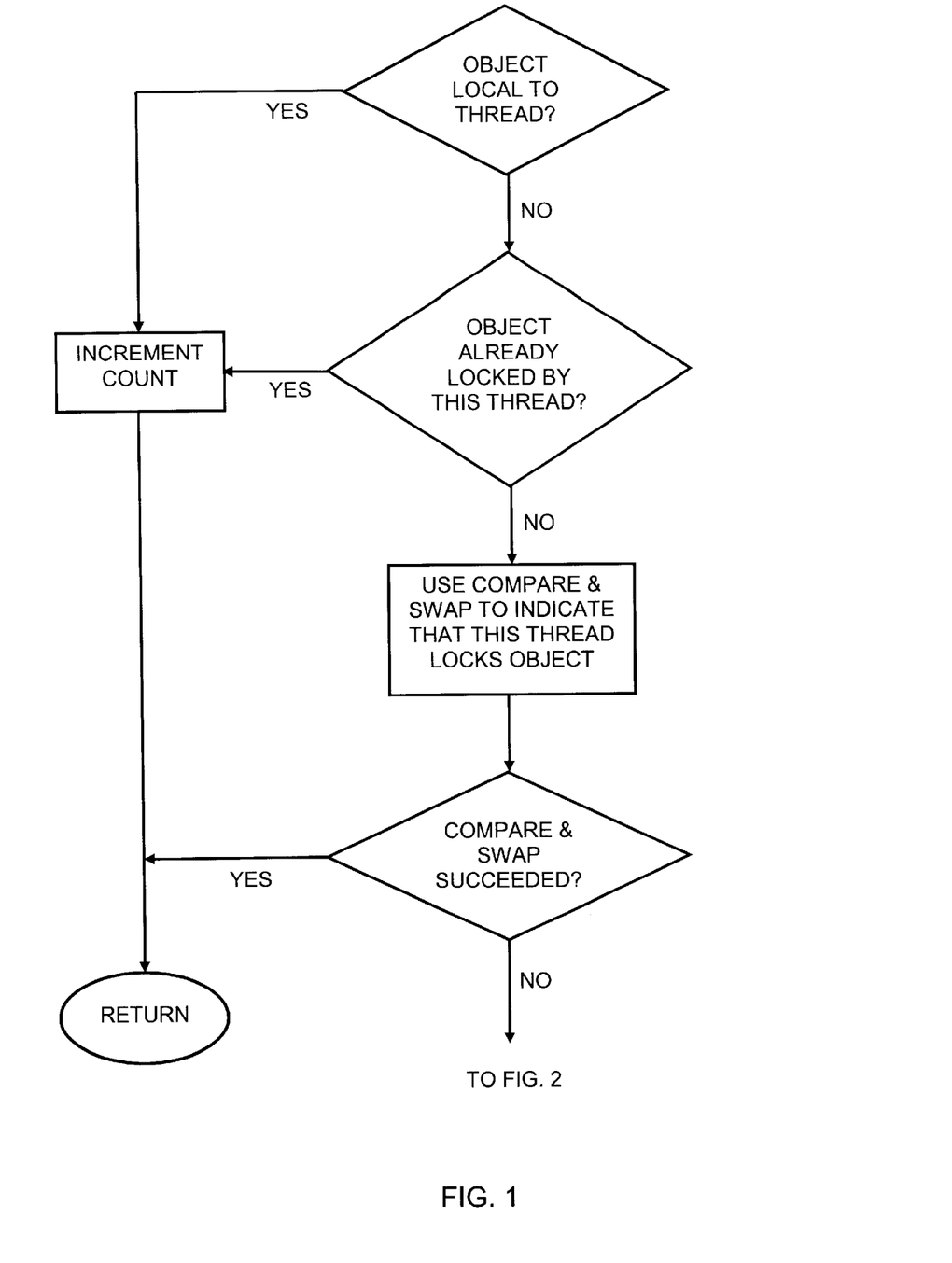
FIGS. 1 to 3 are flow diagrams showing use of the invention to avoid monitor locking for objects that are local to a particular thread and can be accessed solely by that thread.
Figure 2:
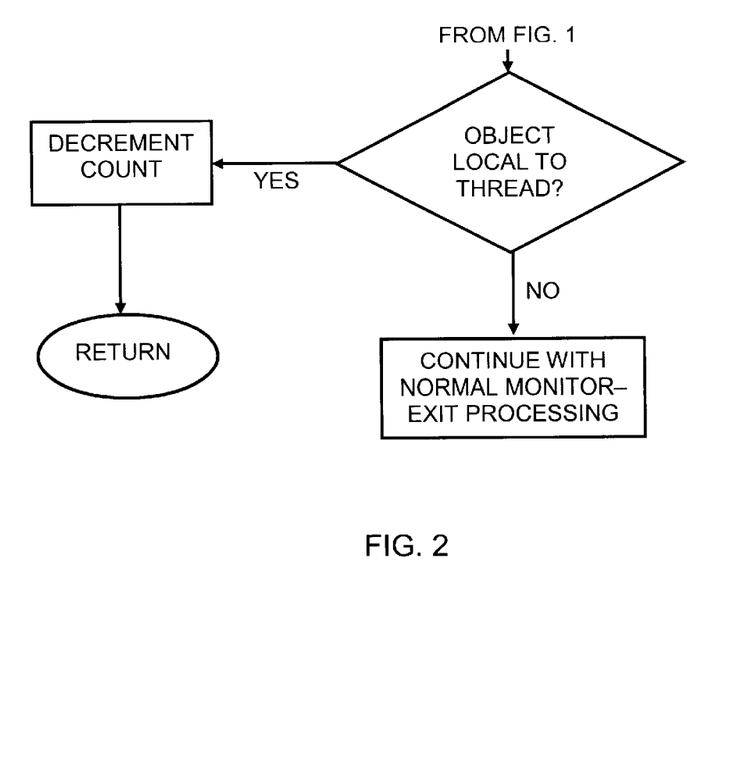

As shown in FIGS. 1 and 2, in particular, consider monitor enter and monitor exit. We assume that a count is associated with each object (as in the mechanism described by Bacon et al.). The count tracks the number of monitor enters by the owning thread. If an object is thread-local, the count is incremented on monitor enter without synchronization, and it is decremented on monitor exit without synchronization. It the object becomes global (i.e., reachable by another thread) while the monitor is locked by the initial thread, then the normal monitor exit/entrance mechanism with synchronization is now used, with possible adjustment being required to the count.

Upon "monitor enter", a check is made in order to determine if the object is thread local or global. If the object is global, a check is made to determine if the object is already locked by the current thread. If so, then again a count is incremented and the monitor enter event terminates without incurring the overhead of synchronization. Otherwise, if the object is not already locked by the current thread, then compare and swap is used to indicate that the current thread locks the object so that access thereto is denied to other threads. Upon successful termination of compare and swap, which is a relatively expensive overhead, the monitor enter event terminates.

On the other hand, if the object is thread local, a count is incremented and the monitor-enter event terminates without incurring the overhead of synchronization. That is to say, no compare-and-swap is needed when a monitor is obtained. As compare-and-swap (or the sequence of instructions required to implement compare-and-swap) is a relatively expensive operation on most architectures, being an instruction that can take many processor cycles to complete, this is a significant saving.

Figure 3:
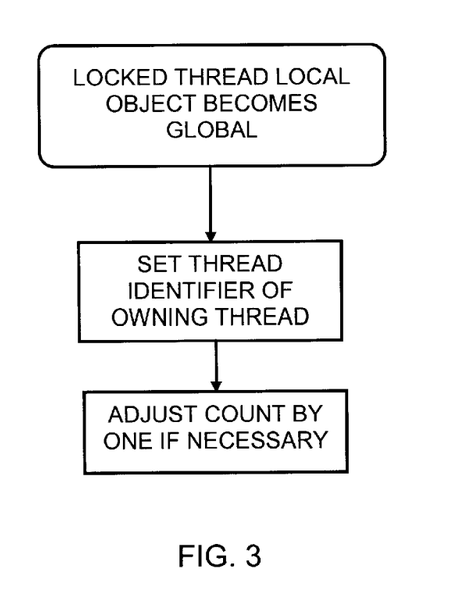

As shown in FIG. 3, when a locked object becomes global, the thread identifier field of the owning thread is set to the thread identifier of the locking thread and the count is adjusted by one, if necessary. The foregoing description of avoiding monitor locking for thread-local objects shows how to modify a monitor mechanism of the type described by Bacon et al. The Bacon mechanism allows quick locking when there is no contention; this quick locking uses a field associated with an object—this field generally fits into 4 bytes (or less) and can be read and updated at the same time. The content of the field depends on whether a quick (thin) lock is being used or a more heavyweight lock is being used. If a quick lock is being used, then the field is split into two—the thread-identifier for the locking thread and a count of the number of times that the thread has locked the object. If the more expensive heavyweight lock is required, e.g., because of contention, then the field contains a pointer to the heavyweight lock.

If the object is thread-local, then we do not need the thread identifier field. We just keep track of the number of times that the lock has been obtained (without a corresponding release) in the count. When the object becomes global, we revert to the Bacon mechanism.

The reason that the count may need to be adjusted by one is as follows. In the Bacon mechanism, if the object is not locked, then its thread-identifier field is set to zero. In order to obtain the first lock, a thread just needs to set the thread-identifier to its identifier. Assuming that an actual thread-identifier is always non-zero, there is no need to also increment the count. A non-zero thread identifier already indicates a count of one. If we use the thread-local mechanism, then we keep track of the actual count; thus, when the object becomes global, we need to decrement the count by one so we can revert smoothly to the Bacon mechanism.

The code for "monitor enter" and "monitor exit" may be generated by a compiler or it may be part of the runtime monitor enter and exit routines. The following code sections show the "monitor enter" and "monitor exit" code in pseudo C:

```
//Each object has a thread_local property, and a
//monitor_counter. The monitor_counter is the
//counter used by each monitor to count the times a
//thread enters the monitor.
monitor enter on object O:
   if (not thread_local(O))
//thread_local is a property of the object
   {
      normal monitor enter code;
   }
   else
      increment monitor_count;
monitor exit on object O:
   if (not thread_local(O))
//thread_local is a property of the object
   {
      normal monitor exit code;
   }
   else
      decrement monitor_count;
```

Multiple Method Implementations

Figure 4:
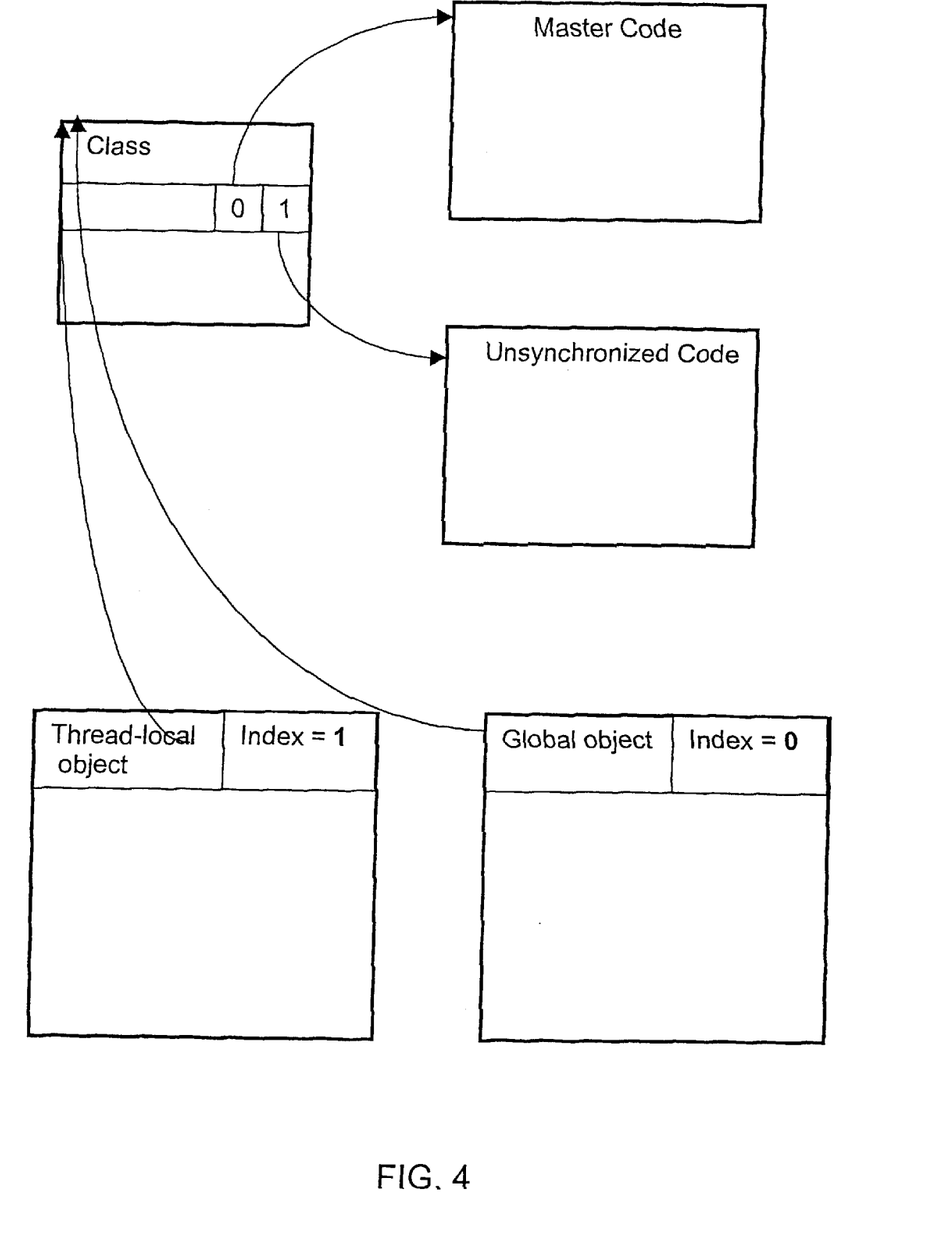
FIG. 4 shows use of an object oriented language mechanism allowing selection of different implementations of an object's methods for reducing a computing overhead associated with an object that is local to a particular thread and can be accessed solely by that thread.

FIG. 4 shows pictorially a data structure 10 and associated mechanism for implementing an object oriented programming language, comprising at least two code blocks 11 and 12 for at least one method of an object of a specified class. Each of the code blocks 11 and 12 contains a different implementation of one of the object's method for use by a thread-local object 13 and a global object 14, respectively. An access mechanism is provided for accessing a desired code block at run-time on a per object instance basis so as to allow selection of a desired implementation of the method without requiring instantiation of an object of a different class.

The selection of which implementation to invoke is integrated into an existing invocation method of the language and is thus transparent to a calling application invoking the mechanism. The mechanism further includes:

(a) invoking one of two implementations for every instance, depending on whether or not the object is thread local;

(b) upon creation of an object setting up the object to allow selection of an implementation that is optimized for a thread-local object; and (c) changing the implementation to perform a non-thread local optimized implementation if the object becomes non-thread-local.

Figure 5:
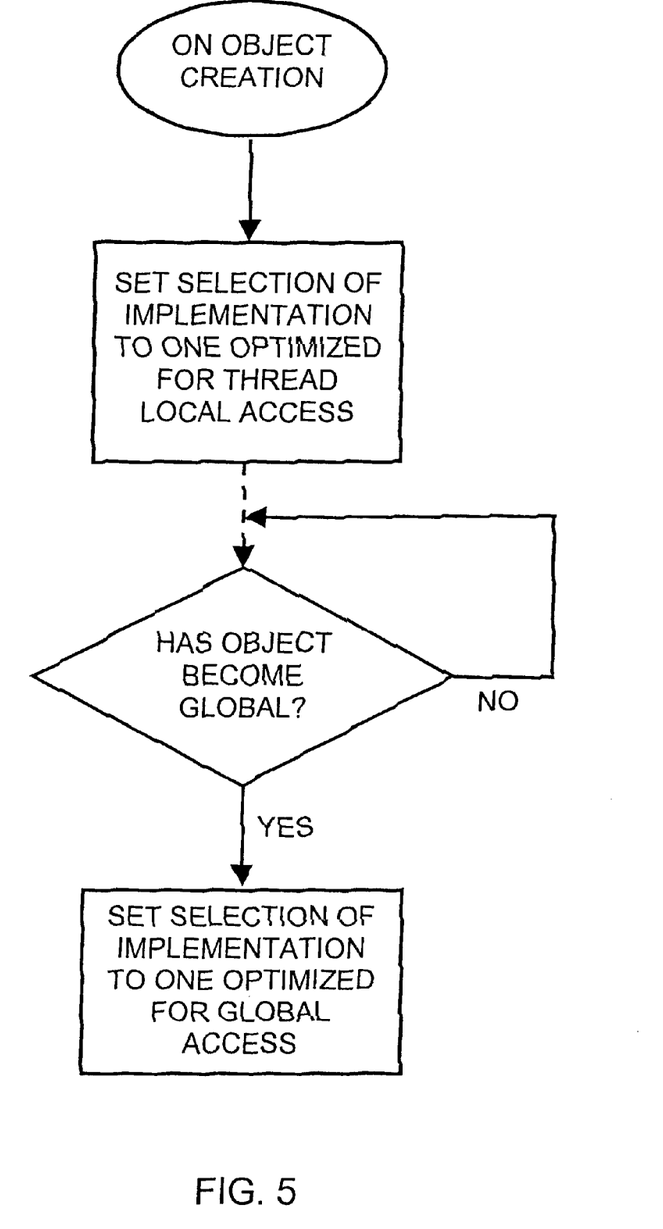
FIG. 5 is a pictorial representation of object architecture for exploiting thread-locality using the mechanism disclosed in our U.S. application Ser. No. 09/317,421.

FIG. 5 shows the principal steps associated with a general object oriented language mechanism allowing different implementations of an object's methods for reducing a computing overhead associated with a thread local object. On object creation, that implementation is selected that is optimized for the thread local process. When the object becomes global, that implementation is selected that is optimized for the global process.

Clearly, the object becoming global does not follow directly from object creation, and for this reason the "connection" between the object being created and its subsequently becoming global is shown by a dotted line. The same is done in FIGS. 6 and 7 described below.

Avoiding Synchronization Using "Smart Code"

The Smart Code mechanism described in co-pending U.S. patent Ser. No. 09/317,421 to Factor et al. and summarized above can be used to reduce the cost of operations on thread local objects. For example, it can be used to eliminate monitor-enter and monitor-exit for synchronized methods on thread local objects in Java.

Terminology

We begin by introducing some terminology:

master code: this is the method implementation as defined by the programmer;

unsynchronized code: this is the master code modified to eliminate synchronization for the object. In the context of Java this is the master code with the synchronized attribute removed from all methods.

There are several ways of employing the smart code mechanism. We assume (as shown in FIG. 4) the implementation of an array of virtual method tables along with an index in the object's header. At method invocation, the appropriate method table is chosen by using the index into the array. In this case, the array size is two: one virtual method table for the master code and the other for the unsynchronized case. The implementation of the method invocation mechanism, which is constituted by the smart code mechanism, "hides" the indirection via the index in the object header. Other ways to exploit the smart code mechanism are described in our U.S. patent Ser. No. 09/317,421 to Factor et al.

When used for providing non-synchronized versions of methods for objects on thread local heaps, when the object is made available to other threads we need to change its implementation from the unsynchronized code to the master code (which contains the code required for synchronization). This is shown in FIG. 4 where the thread-local object uses the unsynchronized code while the global object uses the master code.

It should also be noted that when an object is made available to other threads (becomes global) there may be one or more synchronized methods on the object, which are active. (These methods by definition were invoked by the thread to which the object had been thread local). The proper monitor locks must be obtained for these methods before allowing the object to become global. Furthermore, these methods must now perform a monitor-exit before they return. These methods can be found by scanning the thread's stack and taking the appropriate action as each such method is found. An alternative to examining the stack is to increment or decrement a counter each time a lock is respectively obtained or released on a thread local object. This counter can be manipulated without synchronization. These instructions to manipulate the counter can be added to the unsynchronized code.

Avoiding Overhead While Maintaining Memory Coherency

Sequential consistency guarantees that all processors (threads) see the same order on the stores of other processors. Ensuring sequential consistency for a multi-processor limits the optimizations that can be done by a single CPU. In particular, it does not allow a single CPU to change the order of its access to memory, even though this change of order is done without changing the meaning or the result of a program running on this processor as a uniprocessor. For example, if the instruction stream consists of a Load of location A followed by a load of location B (where A and B are distinct), the processor could complete the load of B before it completes the load of A. It might do this, for example, if A is not in the cache and B is in the cache; then, the processor could initiate the operation to fetch A into the cache and then complete the load of B (since it is in the cache) and then complete the load of A later when it reaches the cache.

There are two types of access to memory—load and store. Varying degrees of memory coherency can be defined by the re-ordering that a processor is allowed to do with respect to loads and stores. Thus, most multiprocessors use weaker forms of consistency. In one such form called "firm consistency" by the present assignee, a processor is allowed to move the execution of a load past a store; no other exchanges being allowed. For example, if the instruction stream contains a store followed by a load, and the target of the store is not in the cache, the processor may complete the load (and subsequent loads) before it completes the store. In another form called "weak consistency" by the present assignee, the processor is allowed to interchange any combination of loads and stores as long as there are no data dependencies. The Power-PC architecture is weakly consistent. Within the context of the present invention and appended claims, the term "weak consistency" is used to refer to memory architectures having a consistency that is weaker than sequential consistency.

Sometimes in order to ensure correct program operation on a multi-processor that is not sequentially consistent, a certain order of loads and stores is required. Memory synchronizing instructions are provided for this purpose. For example, on the Power-PC, a sync instruction guarantees that all of the memory operations (loads and stores) before the sync have completed before any of the memory operations associated with instructions after the sync are executed. These memory synchronization instructions are usually quite expensive, requiring many processor cycles to complete.

In the general case, which must handle the case where an object is global, the implementation of a method for an object may require memory-synchronizing instructions. However, if an object is thread-local, then no other thread can access the contents of the object; thus, there is no need for these synchronizing instructions.

Figure 6:
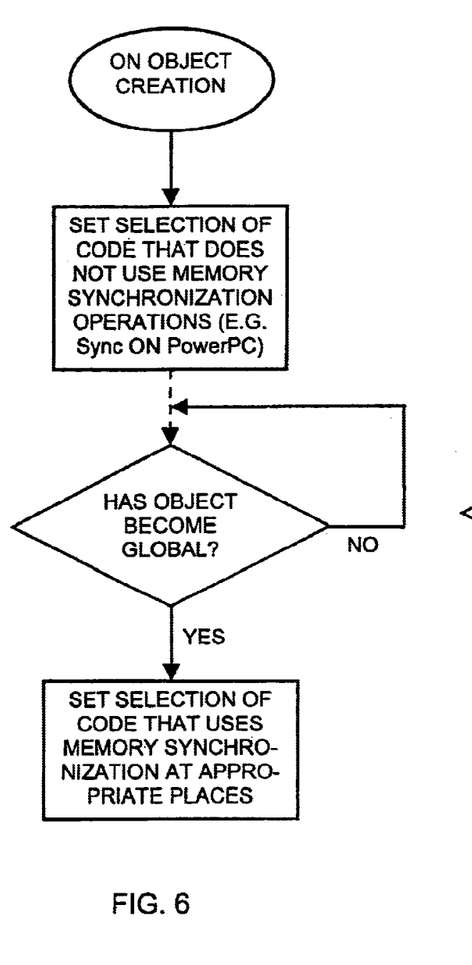
FIG. 6 is a flow diagram showing a mechanism for avoiding memory synchronization operations.

FIG. 6 summarizes the principal steps associated with avoiding memory synchronization on thread local objects. On object creation, code is selected that does not use memory synchronization operations (e.g. sync on PowerPC). When the object becomes global, memory synchronization is executed, if necessary, and code is selected that uses memory synchronization operations at appropriate places.

Avoiding Unnecessary Writes to Memory

Figure 7:
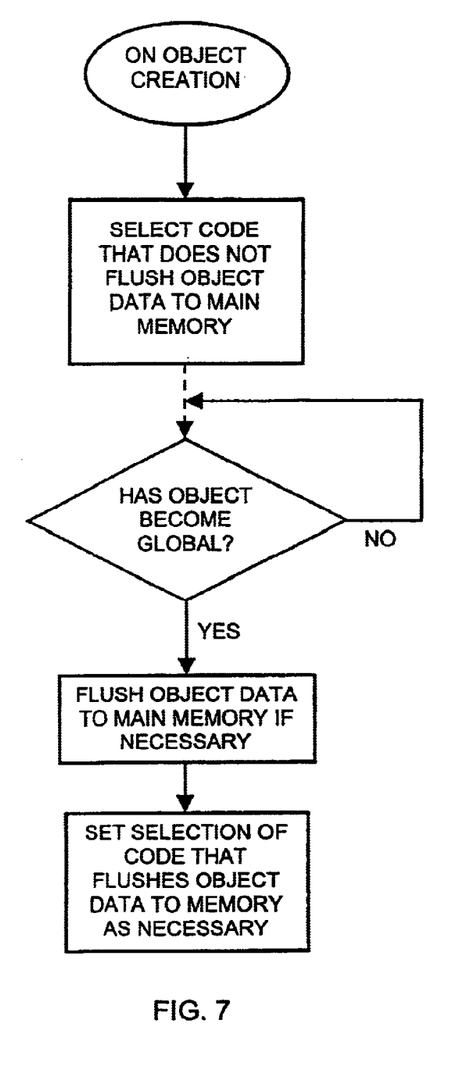
FIG. 7 is a flow diagram showing a mechanism for avoiding the need to flush local data.

FIG. 7 is a flow diagram showing a mechanism for avoiding the need to flush local data. On object creation, that section of code is selected that does not flush object data to main memory. Just before the object becomes reachable by another thread, object data is flushed to main memory if necessary, and that section of code is selected that flushes object data to main memory as necessary. This may also be combined with object synchronization in order to effect synchronization concurrently with flushing the object to main memory.

Mechanism for Detecting Deadlock

Figure 8:
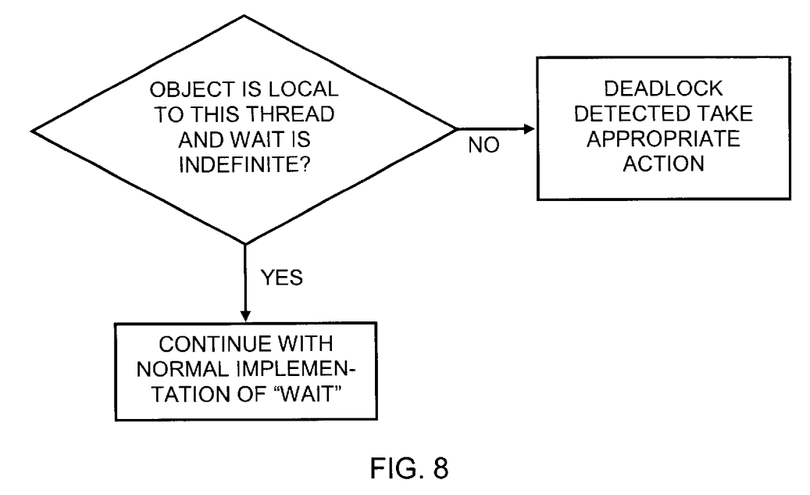
FIG. 8 is a partial flow diagram showing use of the invention to detect deadlock.

FIG. 8 is a partial flow diagram showing use of the invention to detect deadlock when waiting indefinitely for notification by another thread. Deadlock detection algorithms check that the program code does not get into a closed loop. If an object is thread local, then no other thread can have a reference to that object. Consider, for example, a clock counter object waiting notification. Notification can come from another thread executing the notify( ) method on the waiting object. However, since the waiting object is thread local, no other thread has a reference to it and thus no other thread can notify the clock counter object resulting in a deadlock; i.e., the clock counter will wait indefinitely. This condition can be detected; i.e., that the waiting object is thread local whereupon remedial action may be taken. If the object is determined to be global, the normal code wait is executed.

Such a technique may be used to detect deadlock in a Java application, by determining that a thread waits indefinitely for an object that is thread-local since it is impossible for another thread to notify the waiting thread.

Reducing Cache Miss-rate

Figure 9:
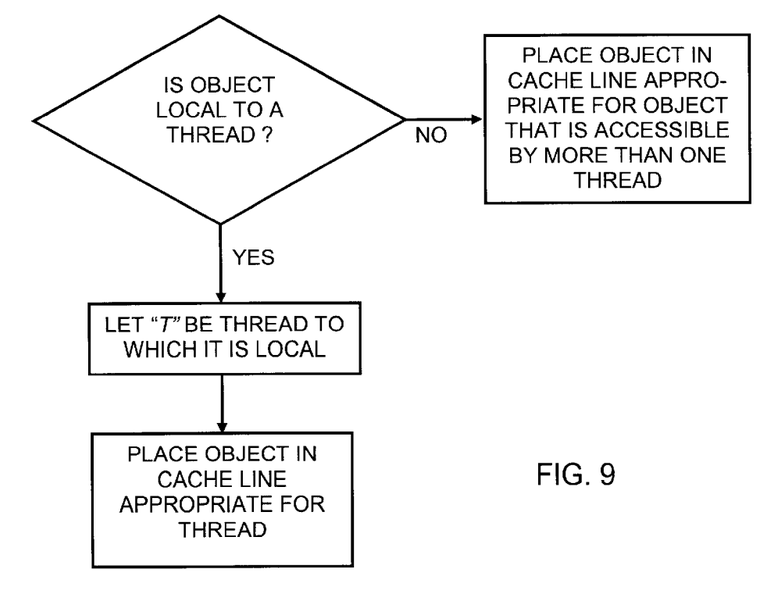
FIG. 9 is a partial flow diagram showing use of the invention for cache placement.

FIG. 9 is a partial flow diagram showing use of the invention for cache placement. Cache memory is provided alongside a CPU typically sharing the same chip as the CPU, such that accessing data in cache is an order of magnitude faster than accessing other memory. Cache architectures assume that when a program needs to access a particular memory location, there is a high probability that it will also need to access near locations in memory. Thus, a cache line, the unit of memory transferred between the cache and main memory, typically contains multiple bytes. A typical cache line size is a power of 2 between 32 and 128 bytes. Small objects are often 32 bytes or less. Thus, typically, more than one object fits in a single cache line.

If it is known that both objects are local to the same thread and are likely to be accessed at the same time, then it makes sense to store them in the same cache line. However, in a multiple processor, all processors access the same memory so caches need to implement a protocol for cache coherency.

Thus, if two objects are accessed by different processors, then no cost reduction can be obtained by storing both objects in the same cache line and the objects should be stored in different cache lines.

For each thread local object to be placed in memory, the object is placed in the cache line appropriate to the specific thread to which the object is local. If the object is global, then it is placed in a memory location mapped to a cache line appropriate for access by more than one thread. This rearrangement of objects according to temporal access patterns and thread-locality can be done as part of garbage collection.

Various cache architectures are employed in order to increase the likelihood that an object required by a processor will already be located in that processor's cache line. Caches may be direct mapped, set-associative or fully-associative. In a direct mapped cache, a memory location can be brought into a single cache location. Thus, if a memory location is accessed and the cache location associated with that memory location is full, then the contents of the cache location must be written back to its memory location before the new memory location is brought into the cache. If the cache is fully-associative, then any cache line can cache any memory location. If the cache is n-way associative, then there are "n" places in which each memory location can be cached.

As an example for a direct mapped cache, suppose the cache holds 1 MB, and the main memory is 128 MB. Then byte 0 of the first MB of main memory and byte 0 of the second MB of main memory map to the same cache location. There are 128 memory ranges that can be mapped to each cache line.

Objects vary in size, but for many language implementations the vast majority of objects are small, e.g., less than 64 bytes. This means that more than one object can fit into a cache line. If two objects are likely to be referenced together, then it is advantageous to put them in the same cache line. Then there will be less cache misses because access to one object will also cause the other object to be brought into the cache.

Furthermore, if two objects are heavily used, but they are not used together, then they should be placed in memory so that they do not compete for the same location in the cache. Thus, continuing the example of the 128 MB memory, two heavily used objects, which are not used together, should not be placed such that one is at byte 0 of the first MB and the other at byte 0 of the second MB.

The invention allows cache misses to be reduced in respect of two objects that are thread-local and likely to be referenced together by placing the objects in memory so that they will be brought back and forth to memory as part of the same cache-line. Furthermore, an object that is global should not be in the same cache line with another object. If two objects, which have no relationship to each other are in the same cache line, then this could cause a condition called "false sharing"—the cache line will bounce back and forth between the processors of a multi-processor in order to preserve what is known as "cache coherency" and thereby increase the number of cache misses.

Cache coherency is responsible for making sure that a processor sees the up-to-date value of a memory location in its cache. Each processor has its own cache but all processors share the main memory. If a memory location is in the cache of more than one processor of a multi-processor, and that memory location is updated by one of the processors then a cache coherency action is necessary. The action depends on the design of the cache. It could involve invalidating the memory location in the other caches—so that the next access will need to reread the value into the cache. Or it could make the same update to all of the caches.

This technique can be combined with garbage collection so that, after becoming global, the object is copied to a main memory location that is mapped to a cache line appropriate to the global area and the garbage collector reconfigures the heap so that local and global objects are maintained in respective areas of the heap.

Security

The invention also allows overheads to be saved when determining whether a thread has the privilege to carry out a required operation. For a thread local object, this need be done only once initially and there is no need to repeat for so long as the object remains thread local.

Figure 10:
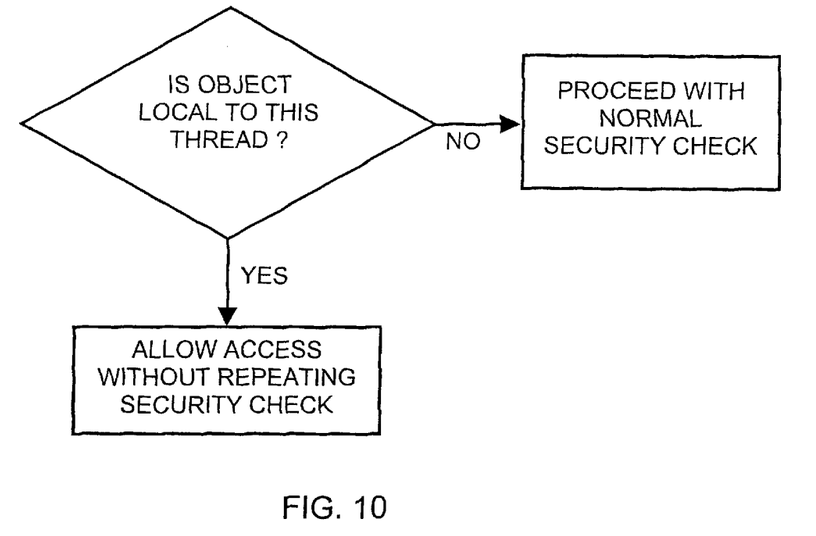
FIG. 10 is a partial flow diagram showing use of the invention to implement selective security checking.

FIG. 10 is a partial flow diagram showing use of the invention to implement selective security checking, in order to eliminate repeated security checks on an object for a security model utilizing thread-based security. Upon determining the object to be thread local, access is allowed to the object without implementing any security procedure. However, if the object is found not to be thread-local, then the normal security procedure is implemented.

System for Carrying out the Invention

Figure 11:
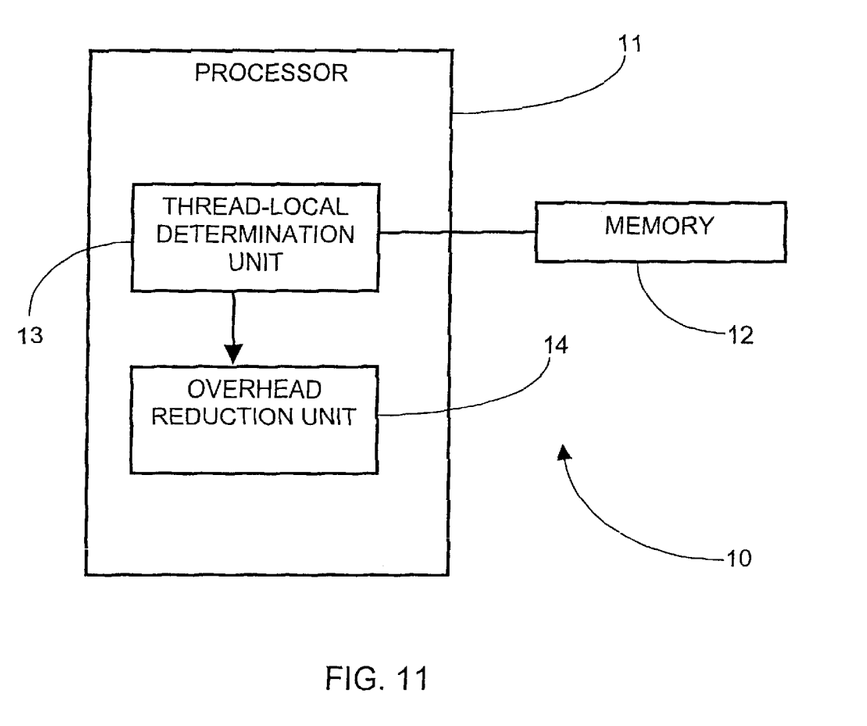
FIG. 11 is a block diagram showing functionally a computer system for carrying out the method of the invention.

FIG. 11 shows functionally a system depicted generally as 10 comprising at least one processor 11 for running at least one program thread and being coupled to a memory 12. The processor 11 includes a thread-local determination unit 13 coupled to the memory 12 for determining whether an object stored in the memory 12 is local to the current thread or global thereto. An overhead reduction unit 14 is responsively coupled to the thread-local determination unit 13 for reducing a computing overhead associated with the object if it is determined to be thread-local. The overhead reduction unit 14 may be programmed to operate in accordance with any of the techniques set out in detail above with reference to FIGS. 1 to 10 of the drawings.

It will be understood that the system 10 is shown very generally. In practice, it may contain more than one processor, in which case the invention may be used, for example, to avoid unnecessary memory synchronization costs on objects that are determined to be thread-local.

General Comments

It will be understood that the method according to the invention may be carried out by a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters used to designate claim steps are provided for convenience only and do not imply any particular order of performing the steps.

What is claimed is:

1. A computer-implemented method for reducing a computing overhead associated with an object based on whether or not it is local to a particular thread, the method comprising:

(a) dynamically tracking the object during run-time so as to derive information as to whether or not the object is local to a particular thread; and (b) using said information to reduce a computing overhead associated with said object.

2. The method according to claim 1, wherein (b) includes:
   (i) reducing a computing overhead associated with an object which is determined to be local to a particular thread.

3. The method according to claim 2, wherein (b) includes eliminating repeated security checks on the object for a security model utilizing thread-based security.

4. The method according to claim 2, wherein (b) includes reducing the computing overhead associated with memory accesses by said thread in respect of one or more objects that are local thereto.

5. The method according to claim 4, wherein (b) includes avoiding unnecessarily writing updates to main memory in respect of an object which is determined to be thread local.

6. The method according to claim 5, for use with a Java application wherein the objects are objects in the heap of the Java application.

7. The method according to claim 2, wherein (b) includes reducing false sharing of global objects by storing global objects in locations of main memory that are associated with different respective locations in cache.

8. The method according to claim 2, wherein (b) includes detecting deadlock.

9. The method according to claim 8, for detecting deadlock in a Java application, including determining that a thread waits indefinitely for an object that is thread-local since it is impossible for another thread to notify the waiting thread.

10. The method according to claim 2, wherein (b) includes avoiding synchronization costs on said object.

11. The method according to claim 10, for use with a language/system that uses a monitor, wherein (b) includes:
    (i) maintaining a count of a number of entries by said monitor;
    (ii) obtaining a monitor lock on a thread local object without synchronization;
    (iii) upon entering the monitor, incrementing the count without synchronization; and
    (iv) upon exiting the monitor, decrementing the count without synchronization.

12. The method according to claim 2, wherein (b) includes avoiding unnecessary memory synchronization operations in respect of an object which is determined to be thread local in weak consistency architectures.

13. The method according to claim 1, wherein (b) includes improving cache locality for said objects.

14. The method according to claim 13, wherein (b) includes:
    (i) storing objects local to a particular thread in a cache line associated with said thread; and
    (ii) storing objects that are accessed by more than one thread in memory locations of a main memory that will not contend for the same location of cache.

15. The method according to claim 1, further including using a data structure and associated mechanism for implementing an object oriented programming language, the data structure and associated mechanism comprising:
    at least two code blocks for at least one method of an object of a specified class, each of said code blocks containing a different implementation of said at least one method; and
    an access mechanism for accessing a desired code block at run-time on a per object instance basis so as to allow selection of a desired implementation of said at least one method without requiring instantiation of an object of a different class;
    said selection of which implementation to invoke being integrated into an existing invocation method of said object oriented programming language and thus being transparent to a calling application invoking said at least one method;
    and wherein said method further includes:
    (i) invoking one of two implementations for every class, depending on whether or not the object is thread local;
    (ii) upon creation of an object setting up the object to allow selection of an implementation that is optimized for a thread-local object; and
    (iii) changing the implementation to perform a non-thread local optimized implementation if the object becomes non-thread-local.

16. A computer-implemented method for reducing a computing overhead associated with objects that are local to a particular thread, comprising:
    (a) determining that an object that is local to a particular thread; and
    (b) eliminating repeated security checks on the object for a security model utilizing thread-based security.

17. A computer-implemented method for reducing a computing overhead associated with an object based on whether or not it is local to a particular thread, the method comprising:
    (a) deriving information as to whether or not the object is local to a particular thread; and
    (b) using said information to reduce a computing overhead associated with a memory access by said thread in respect of said object when the object is not local to a particular thread.

18. The method according to claim 17, wherein (b) includes improving cache locality for said object.

19. The method according to claim 18, wherein (b) includes:
    (i) storing objects local to a particular thread in a cache line associated with said thread; and
    (ii) storing objects that are accessed by more than one thread in memory locations of a main memory that will not contend for an identical location of cache.

20. A computer-implemented method for reducing a computing overhead associated with objects that are local to a particular thread, the method comprising:
    (a) determining that an object that is local to a particular thread; and
    (b) detecting deadlock.

21. The method according to claim 20, for detecting deadlock in a Java application, including determining that a thread waits indefinitely for an object that is thread-local since it is impossible for another thread to notify the waiting thread.

22. A computer-implemented method for reducing a computing overhead associated with objects that are local to a particular thread for use with a language/system that uses a monitor, the method comprising:
    (a) determining that an object is local to a particular thread;
    (b) maintaining a count of a number of entries by said monitor;
    (c) obtaining a monitor lock on a thread local object;
    (d) upon entering the monitor, incrementing the count without synchronization; and (e) upon exiting the monitor, decrementing the count without synchronization.

23. A computer-implemented method for reducing a computing overhead associated with an object that is local to a particular thread, the method comprising:
   (a) using a data structure and associated mechanism for implementing an object oriented programming language, comprising:
      at least two code blocks for at least one method of an object of a specified class, each of said code blocks containing a different implementation of said at least one method, and
      an access mechanism for accessing a desired code block at run-time on a per object instance basis so as to allow selection of a desired implementation of said at least one method without requiring instantiation of an object of a different class;
      said selection of which implementation to invoke being integrated into an existing invocation mechanism of said object oriented programming language and thus being transparent to a calling application invoking said at least one method;
   (b) invoking one of two implementations for every class, depending on whether the object is thread local or global, respectively;
   (c) upon creation of an object setting up the object to allow selection of an implementation that is optimized for a thread-local object; and
   (d) changing the implementation to perform a non-thread local optimized implementation if the object becomes non-thread-local.

24. A computer programmed for reducing a computing overhead associated with an object based on whether or not it is local to a particular thread, said computer comprising:
   a memory storing objects associated with one or more program threads; and
   at least one processor coupled to said memory and including:
      a thread-local determination unit for tracking dynamically during run time whether an object is local to a particular thread; and
      an overhead reduction unit responsively coupled to the thread-local determination unit for reducing a computing overhead associated with said object.

25. The computer according to claim 24, wherein the object is determined to be thread-local and the overhead reduction unit is adapted to eliminate repeated security checks on the object for a security model utilizing thread-based security.

26. The computer according to claim 24, wherein the overhead reduction unit is adapted to reduce the computing overhead associated with memory accesses by said thread in respect of one or more objects that are local thereto.

27. The computer according to claim 24, wherein the overhead reduction unit is adapted to improve cache locality for said objects.

28. The computer according to claim 27, wherein the overhead reduction unit is adapted to:
   (i) store objects local to a particular thread in a cache line associated with said thread; and
   (ii) store objects that are accessed by more than one thread in memory locations of a main memory that will not contend for an identical location of cache.

29. The computer according to claim 27, wherein the overhead reduction unit is adapted to avoid unnecessarily writing updates to main memory in respect of an object which is determined to be thread local.

30. The computer according to claim 29, for use with a Java application and wherein the objects are objects in the heap of the Java application.

31. The computer according to claim 24, wherein the overhead reduction unit is adapted to detect deadlock.

32. The computer according to claim 31, wherein the overhead reduction unit is adapted to detect deadlock in a Java application, and includes a deadlock unit for determining that a thread waits indefinitely for an object that is thread-local since it is impossible for another thread to notify the waiting thread.

33. The computer according to claim 24, wherein the overhead reduction unit is adapted to avoid synchronization costs on said object.

34. The computer according to claim 33, being programmed for use with a language/system that uses a monitor, wherein the overhead reduction unit is adapted to:
   (i) maintain a count of a number of entries by said monitor;
   (ii) obtain a monitor lock on a thread local object without synchronization;
   (iii) increment the count without synchronization upon entering the monitor; and
   (iv) decrement the count without synchronization upon exiting the monitor.

35. The computer according to claim 24, further including using a data structure and associated mechanism for implementing an object oriented programming language, comprising:
   at least two code blocks for at least one method of an object of a specified class, each of said code blocks containing a different implementation of said at least one method, and
   an access mechanism for accessing a desired code block at run-time on a per object instance basis so as to allow selection of a desired implementation of said at least one method without requiring instantiation of an object of a different class;
   said selection of which implementation to invoke being integrated into an existing invocation method of said language and thus being transparent to a calling application invoking said at least one method;
   and wherein the overhead reduction unit further includes:
      (i) invoking one of two implementations for every class, depending on whether or not the object is thread local;
      (ii) upon creation of an object setting up the object to allow selection of an implementation that is optimized for a thread-local object; and
      (iii) changing the implementation to perform a non-thread local optimized implementation if the object becomes non-thread-local.

36. The computer according to claim 24, wherein the overhead reduction unit is adapted to avoid unnecessary memory synchronization operations in respect of an object which is determined to be thread local in weak consistency architectures.

37. A computer programmed for reducing a computing overhead associated with objects that are local to a particular thread, said computer being adapted to:
   (a) determine that an object that is local to a particular thread; and
   (b) eliminate repeated security checks on the object for a security model utilizing thread-based security.

38. A computer programmed for reducing a computing overhead associated with an object based on whether or not it is local to a particular thread, said computer comprising:

a memory storing objects associated with one or more program threads, and at least one processor coupled to said memory and including:

a thread-local determination unit for tracking dynamically during run time whether an object is local to a particular thread, and an overhead reduction unit responsively coupled to the thread-local determination unit for reducing a computing overhead associated with memory accesses by said thread in respect of one or more objects that are local thereto.

39. The computer according to claim 38, wherein the overhead reduction unit is adapted to improve cache locality for said objects.

40. The computer according to claim 39, wherein the overhead reduction unit is adapted to store objects local to a particular thread in a cache line associated with said thread, and to store objects that are accessed by more than one thread in memory locations of a main memory that will not contend for an identical location of cache.

41. A computer programmed for reducing a computing overhead associated with objects that are local to a particular thread, said computer comprising:

a memory storing objects associated with one or more program threads; and at least one processor coupled to said memory and including:

a thread-local determination unit for tracking dynamically during run time whether an object is local to a particular thread; and an overhead reduction unit responsively coupled to the thread-local determination unit for determining that an object that is local to a particular thread, and detecting deadlock.

42. The computer according to claim 41, for detecting deadlock in a Java application, wherein the overhead reduction unit is adapted to determine that a thread waits indefinitely for an object that is thread-local since it is impossible for another thread to notify the waiting thread.

43. A computer programmed for reducing a computing overhead associated with objects that are local to a particular thread for use with a language/system that uses a monitor, said computer comprising:

a memory storing objects associated with one or more program threads; and at least one processor coupled to said memory and including:

a thread-local determination unit for tracking dynamically during run time whether an object is local to a particular thread; and an overhead reduction unit responsively coupled to the thread-local determination unit for:

(a) determining that an object that is local to a particular thread;

(b) maintaining a count of a number of entries by said monitor;

(c) obtaining a monitor lock on a thread local object;

(d) upon entering the monitor, incrementing the count without synchronization; and (e) upon exiting the monitor, decrementing the count without synchronization.

44. A computer programmed for reducing a computing overhead associated with objects that are local to a particular thread, said computer being adapted to:

(a) use a data structure and associated mechanism for implementing an object oriented programming language, comprising:

at least two code blocks for at least one method of an object of a specified class, each of said code blocks containing a different implementation of said at least one method, and an access mechanism for accessing a desired code block at run-time on a per object instance basis so as to allow selection of a desired implementation of said at least one method without requiring instantiation of an object of a different class;

said selection of which implementation to invoke being integrated into an existing invocation mechanism of said object oriented programming language and thus being transparent to a calling application invoking said at least one method;

(b) invoke one of two implementations for every class, depending on whether the object is thread local or global; respectively;

(c) upon creation of an object set up the object to allow selection of an implementation that is optimized for a thread-local object; and (d) change the implementation to perform a non-thread local optimized implementation if the object becomes non-thread-local.

45. A program storage device readable by machine, tangibly embodying a program of instructions executable by the machine to perform a method for reducing a computing overhead associated with objects that are local to a particular thread, said method comprising:

(a) determining dynamically during run time that an object is local to a particular thread; and (b) reducing a computing overhead associated with said object.

46. A computer program product comprising a computer useable medium having computer readable program code embodied therein for reducing a computing overhead associated with objects that are local to a particular thread, the computer program product comprising:

computer readable program code for causing the computer to determine dynamically during run time that an object is local to a particular thread; and computer readable program code for causing the computer to reduce a computing overhead associated with said object.

47. A program storage device readable by machine, tangibly embodying a program of instructions executable by the machine to perform a method for reducing a computing overhead associated with an object based on whether or not it is local to a particular thread, said method comprising:

(a) dynamically tracking the object during run-time so as to derive information as to whether or not the object is local to a particular thread; and (b) using said information to reduce a computing overhead associated with said object.

48. A computer program product comprising a computer useable medium having computer readable program code embodied therein for reducing a computing overhead associated with an object based on whether or not it is local to a particular thread, the computer program product comprising:

computer readable program code for causing the computer to dynamically track the object during run-time so as to derive information as to whether or not the object is local to a particular thread; and computer readable program code for causing the computer to use said information to reduce a computing overhead associated with said object.

* * * * *